United States Patent
Khan et al.

(10) Patent No.: US 11,398,880 B2
(45) Date of Patent: **\*Jul. 26, 2022**

(54) PHY ERROR INDICATION MESSAGING

(71) Applicant: Parallel Wireless, Inc., Nashua, NH (US)

(72) Inventors: Mudassar Khan, Pune (IN); Ajay Sharma, Pune (IN); Somasekhar Pemmasani, Bangalore (IN)

(73) Assignee: Parallel Wireless, Inc., Nashua, NH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/009,638

(22) Filed: Sep. 1, 2020

(65) Prior Publication Data

US 2020/0403729 A1 Dec. 24, 2020

Related U.S. Application Data

(63) Continuation of application No. 16/196,763, filed on Nov. 20, 2018, now Pat. No. 10,763,996, which is a continuation of application No. 15/479,273, filed on Apr. 4, 2017, now Pat. No. 10,135,570.

(60) Provisional application No. 62/318,029, filed on Apr. 4, 2016.

(51) Int. Cl.
*H04L 1/00* (2006.01)
*H04W 80/08* (2009.01)
*H04W 80/02* (2009.01)
*H04W 80/04* (2009.01)

(52) U.S. Cl.
CPC .......... *H04L 1/0061* (2013.01); *H04L 1/0045* (2013.01); *H04W 80/02* (2013.01); *H04W 80/04* (2013.01); *H04W 80/08* (2013.01)

(58) Field of Classification Search
CPC . H04L 1/0061; H04L 1/0045; H04L 43/0888; H04W 80/02; H04W 80/04; H04W 80/08
See application file for complete search history.

(56) References Cited

U.S. PATENT DOCUMENTS

| | | | | |
|---|---|---|---|---|
| 10,135,570 B2 * | 11/2018 | Khan | .................... | H04L 1/0045 |
| 10,763,996 B2 * | 9/2020 | Khan | .................... | H04L 1/0045 |
| 2003/0193924 A1 * | 10/2003 | Gehring | .................. | H04L 12/43 370/345 |

(Continued)

*Primary Examiner* — Christine T. Tu
(74) *Attorney, Agent, or Firm* — Michael Y. Saji; David W. Rouille

(57) ABSTRACT

This disclosure introduces an advancement to the error indication message to provide detailed information about errors in configurations that are arriving from the Layer 2 to the Layer 1. A method is disclosed, comprising: performing physical layer control (PHY) of a wireless signal at a Layer 1 (L1) software module; performing medium access control (MAC) of the wireless signal at a Layer 2 (L2) software module; providing an application programming interface between the L1 software module and the L2 software module for receiving L1 configuration messages and providing error codes to the L2 software module; receiving a L1 configuration message at a Layer 1 software module; and providing an enhanced error code progressively from a L1 software module to the Layer 2 (L2) software module.

13 Claims, 4 Drawing Sheets

(56) References Cited

U.S. PATENT DOCUMENTS

2010/0091759 A1\* 4/2010 Stahl .................. H04L 12/2832
370/347
2019/0342809 A1\* 11/2019 Kim .................. H04W 36/0055

\* cited by examiner

PHY ERROR INDICATION MESSAGING

CROSS-REFERENCE TO RELATED APPLICATIONS

This application in a continuation of, and claims the benefit of priority under 35 U.S.C. § 120 of U.S. patent application Ser. No. 16/196,763, titled "PHY Error Indication Messaging", and filed Nov. 20, 2018, which is a continuation of, and claims the benefit of priority under 35 U.S.C. § 120 of U.S. patent application Ser. No. 15/479,273, titled "PHY Error Indication Messaging", and filed Apr. 4, 2017, which itself claims the benefit under 35 U.S.C. § 119(e) of U.S. Provisional Patent Application No. 62/318,029, filed Apr. 4, 2016, and entitled "Advancement of FAPI Error Indication Messaging for 4G Systems," which are each hereby incorporated by reference in its entirety for all purposes. Additionally, U.S. Pat. App. Pub. Nos. US20140086120, US20140092765, US20140133456, US20150045063, and US20150078167 are hereby incorporated by reference in their entirety for all purposes. Small Cell Forum, Release 5, LTE SCAPI, March 2015 is also hereby incorporated by reference in its entirety for all purposes.

BACKGROUND

Fast Application Programming Interface, better known as FAPI, is a standard developed by the LTE Femto Forum in which exchange of information between the two layers is performed via certain message structures. 4G systems of today, such as those that use the 3GPP Long Term Evolution (LTE) standard, can make use of this FAPI standard in order to exchange configurations between different layers in the radio software stack, as well as reporting indications and errors upward in the stack. FAPI, like other APIs, is a set of routines, rules or protocols that are used to build or connect software components. The FAPI standard provides a clear picture of how a LTE-based layered system is interconnected within itself and how information exchange is carried out as a whole.

SUMMARY

Systems and methods for error indication messaging are disclosed.

In a first embodiment, a method is disclosed, comprising: performing physical layer control (PHY) of a wireless signal at a Layer 1 (L1) software module; performing medium access control (MAC) of the wireless signal at a Layer 2 (L2) software module; providing an application programming interface between the L1 software module and the L2 software module for receiving L1 configuration messages and providing error codes to the L2 software module; receiving a L1 configuration message at a Layer 1 software module; and providing a progressively generated enhanced error code from a L1 software module to the Layer 2 (L2) software module, the enhanced error code based on progressive error checking of the received L1 configuration message at the L1 software module prior to installation as a configuration for the L1 software module.

Providing the enhanced error code may further comprise performing boundary range error checking of each parameter sent in the L1 configuration message against an acceptable range for the each parameter. Providing the enhanced error code may further comprise subsequently performing error checking of a number of requested downlink (DL) or uplink (UL) protocol data units (PDUs) sent in the L1 configuration message against a supported number of DL or UL PDUs supported by the L1 software module. Providing the enhanced error code may further comprise subsequently performing error checking of a scheduling configuration sent in the L1 configuration message against a computation capacity constraint of the L1 software module. Providing the enhanced error code may further comprise subsequently performing error checking of each configuration instruction sent in the L1 configuration message to identify pointer violation or memory alignment issues. Providing the enhanced error code may further comprise subsequently performing error checking of calculated parameters based on parsing parameters sent in the L1 configuration message, and of a scheduling limitation of the L1 software module.

Providing the enhanced error code may further comprise: performing boundary range error checking of each parameter sent in the L1 configuration message against an acceptable range for the each parameter; performing error checking of a number of requested downlink (DL) or uplink (UL) protocol data units (PDUs) sent in the L1 configuration message against a supported number of DL or UL PDUs supported by the L1 software module; performing error checking of a scheduling configuration sent in the L1 configuration message against a computation capacity constraint of the L1 software module; performing error checking of each configuration instruction sent in the L1 configuration message to identify pointer violation or memory alignment issues; and performing error checking of calculated parameters based on parsing parameters sent in the L1 configuration message, and of a scheduling limitation of the L1 software module. These steps may be performed in any order. The method may further comprise creating the enhanced error code based on a union of multiple error checking results, thereby providing error codes reflecting a plurality of errors in the L1 configuration message.

The method may further comprise creating an error record in a database, the error record being the L1 configuration message associated with the enhanced error code. The method may further comprise correcting a subsequent L1 configuration message based on the error record. The method may further comprise storing a corrected L1 configuration message in association with the error record, and substituting a subsequent L1 configuration message with the corrected L1 configuration message prior to providing the corrected L1 configuration message to the L1 software module. The application programming interface may be a Fast Application Programming Interface (FAPI). The L1 software module and the L2 software module may be located at an LTE base station, and wherein receiving the L1 configuration message and providing the enhanced error code may be performed at the LTE base station. The L1 software module and the L2 software module may be located at a 2G, 3G, 4G, 5G, Wi-Fi, or multi-radio access technology (multi-RAT) base station, and wherein receiving the L1 configuration message and providing the enhanced error code may be performed at the 2G, 3G, 4G, 5G, Wi-Fi, or multi-RAT base station.

In a second embodiment, a Long Term Evolution (LTE) base station is disclosed, comprising: a processor coupled to a radio transceiver; a memory coupled to the processor; a Layer 1 (L1) software module, configured to execute on the processor, for providing physical layer (PHY) capability; and a Layer 2 (L2) software module, configured to execute on the processor, providing medium access control (MAC) layer capability, The L1 software module may be configured to: provide an application programming interface between a Layer 1 (L1) software module and a Layer 2 (L2) software module for receiving L1 configuration messages and providing error codes to the L2 software module; receive a L1 configuration message at a Layer 1 software module; and provide an enhanced error code from a L1 software module to the Layer 2 (L2) software module, the enhanced error code based on progressive error checking of the received L1 configuration message at the L1 software module prior to installation as a configuration for the L1 software module.

DETAILED DESCRIPTION

I. Introduction

Figure 1:
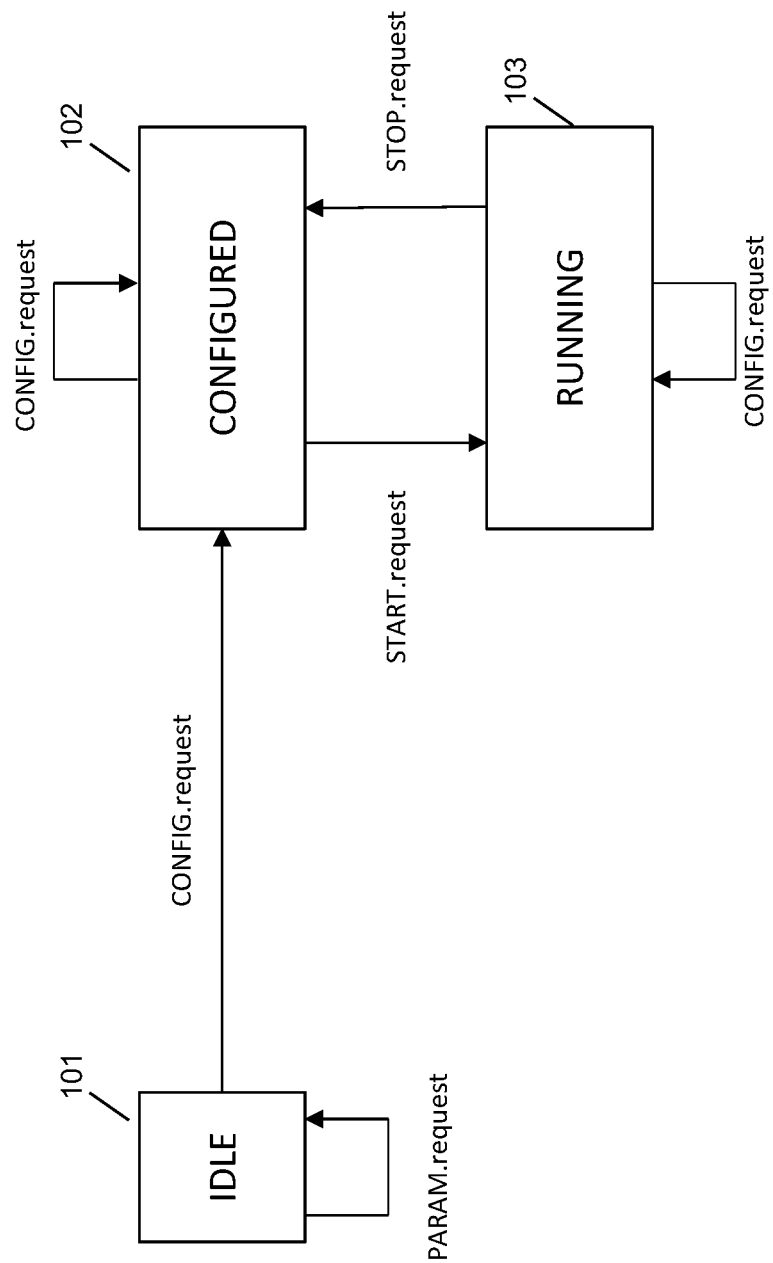
FIG. 1 is a schematic diagram of physical layer 1 (PHY) logical states, in accordance with some embodiments.

This disclosure introduces an advancement to the error indication message to provide detailed information about errors in configurations that are arriving from the Layer 2 to the Layer 1. Specifically, this disclosure describes an Advancement in the Error Indication Messages for a LTE based system which would relay the information from Layer 1 to Layer 2 about the configurations which have encountered an error and also providing details of the area of code in which the issue was found in Layer 1. The Layer 2 can utilize this information to avoid such configurations to be sent down to Layer 1 and to instead send the next best known configuration and to avoid any crash scenarios. These details can also provide a detailed level of debugging on the Layer 1 level reducing the debugging time allowing more efficiency by detecting and pinpointing issues or bugs. This detailed information can also be utilized to prevent Layer 2 to send such configurations to Layer 1, and to provide help and support for troubleshooting problems with such configurations. A database coupled to the Layer 2 module may log such wrong configurations with timestamps, which can be useful for debugging purpose by pinpointing exactly at which location in the Layer 1 the issues are found.

As disclosed below, the error indication message can be modified to provide better and more detailed information about the errors being reported, which can help developers and testers to locate issues more quickly or in real time, rather than forcing them to capture and analyze the logs. This will provide a benefit in the debugging process by reducing the overall time. The paper only discuss one of the many different possible ways this error indication message can be modified to provide improved functionality, and can be modified henceforth other Layer 1 specific designs.

The paper is spilt into various sections. An introduction to LTE based FAPI message exchange and the details are covered in Sections II. Section III introduces the benefits of advanced Error Protection Messaging. Section IV provides details on the Advancement of the Error Protection Message about the structure and how it will relay the information to Layer 2. Section V provides a detailed example of the overall Error Protection Messaging.

II. Introduction to FAPI for LTE 4G Systems

The LTE FAPI developed by the Femto Forum describes the FAPI standard by dividing it into two sections: (1) Providing a description of typical procedures which will occur between the L1 and L2/L3 software; and (2) Providing the definition of the L1 API messages. In this section a brief description of the two sections is covered.

L1 & L2/L3 Procedures

This section gives an overview of the procedures which use the L1 API. These procedures are split into two groups, namely, configuration procedures and sub-frame procedures. Configuration procedures handle the management of the PHY layer and are expected to occur infrequently. Sub-frame procedures determine the structure of each 1 ms sub-frame and operate with a 1 ms periodicity. The configuration procedures supported by the L1 API are: Initialization; Termination; Restart; Reset; and Error notification. These procedures will move the Layer 1 through the IDLE, CONFIGURED and RUNNING states, as shown in FIG. 1.

FIG. 1 is a schematic diagram of physical layer 1 (PHY) logical states, in accordance with some embodiments. State 101 is an IDLE state of a PHY layer. State 102 is a CONFIGURED state of a PHY layer. State 103 is a RUNNING state of a PHY layer. The PHY layer remains in IDLE state 101 until it receives a CONFIG.request, which causes a state change to the CONFIGURED state 102. (If a PARAM.request is sent to a PHY in an IDLE state 101, the request is handled and the PHY remains in IDLE state 101.) The PHY layer enters the CONFIGURED state 102, and may be further configured, as shown by the state change arrow for CONFIG.request from CONFIGURED state 102 to itself. Once the PHY layer is fully configured, the PHY layer may receive a START.request to cause the PHY to enter into a RUNNING state 103. The PHY may accept CONFIG.requests in the RUNNING state, to be reconfigured on the fly. The PHY may also receive STOP.requests, to return to CONFIGURED state 102 and to stop transmitting or receiving, as appropriate.

A list of the L1 API configuration messages which are valid in each state is given a Table 1.

TABLE 1

| L1 API configuration messages | | |
|---|---|---|
| Idle State | Configured State | Running State |
| PARAM.request | PARAM.request | |
| CONFIG.request | CONFIG.request | CONFIG.request |
| | START.request | STOP.request |

L1 API Messages

The general message format of the L1 API is shown in Table 3, where it can be seen that each L1 API message consists of a header followed by a message body. The generic header consists of a message type ID, a message body length and a vendor-specific body length. The current list of message types is given in Table 2. The L1 API messages follow a standard naming convention where: all request messages are sent from the L2/L3 software to the PHY; all response messages are sent from the PHY to the L2/L3 software. These are sent in response to a request; and all indication messages are sent from the PHY to the L2/L3 software. These are sent asynchronously.

III. Benefits of Advanced Error Indication Messages

The current FAPI error indication message provides certain details to Layer 2 at various levels. However, it has been observed during the development stages that the details provided to the Layer 2 in the error indication message is not sufficient to pinpoint the precise issue, which results in a great amount of round trip time debugging. A modification to the error indication message is proposed to ease this issue. The details of the modification are provided in section IV.

Wrong configurations or misconfigurations can occur due to various reasons (i.e. Layer 2 sending wrong parameters, corruption on memory on Layer 1 etc.), and may result in serious impacts on the overall system. For instance, in a scenario when a wrong configuration arrives at the Layer 1 the Layer 1 may not be in a position to process the data received. This may result in drop in throughput, further causing CRC failure and retransmission. Or as another example, misconfigurations at L1 (from L2) can cause the system to crash, leading to rebooting of the node and re-attaching of UEs to the node, which can affect overall system and network performance. Or as another example, in a case when multiple CRC failures occur and the system has reached its maximum retries, the User Equipment (UE) may move into the link loss state. The UE going into link loss would require a re-network entry in order for it to attach back onto the network. This may result in wasted resources and may reduce the efficiency of the network system.

Unlike the current error reporting mechanism from PHY layer, which typically provides only general information to the MAC layer, the disclosed design can give more accurate information regarding which parameter went wrong. For example, in ulconfig, if a modulation coding scheme (MCS) value with, for example, correct values of 2, 4, 6, becomes corrupted due to any reason, then the data is not decoded. If this happens without this disclosed method, it may be difficult to catch the issue. If the disclosed method is used it will send the unique error code to MAC. For example. for ulconfig the 32 error code bit field can be designed as follows: error code=(ERROR|FATAL|LTE|PUSCH|PUSCH_PARSE|ERROR_MCS).

Similarly, for example, in dlconfig, if a number of layers does not match a supported number of antennas, then the DL data may partially decode or not decode at all. This kind of issue is sometimes very tricky to resolve. And based on experience these errors are due to improper configuration. For example, an exemplary error code for dlconfig could be designed as follows: (ERROR|FATAL|LTE|PDSCH|PDSCH_PARSE|ERROR_NUM_LAYER).

Many issues may thus be solved more quickly If we have accurate information at right time, avoiding spending a great deal of effort to resolve the wrong configuration issues. Further information about these exemplary error codes appears below.

IV. Details of Advanced Error Indication Messages

In some embodiments, an Advanced Error Indication message can provide additional information which can help to pinpoint the location at which the issue was found in the Layer 1. The Advance Error Indication message can also be extended to a further use by providing a support over Layer 2, where such issue faced at Layer 1 can be recorded onto a database. This database can be useful to the Layer 2 scheduler where the future configurations can be compared with the configurations in database before being applied. If such a configuration is found then the next best configuration could be applied to avoid any further issues on the Layer 1.

The Error Indication msg have two stage of reporting, first is error code and other is sbl_error_msg_body. The error code is able to send limited information. Where our design upgrades the error reporting mechanism, it is exploited and adds a new hierarchy in sbl_error_msg_body as comp error, shown below in Table 2 and Table 3. The added changes in the error indication message provide space to include a new error code design described below.

In some embodiments, the advanced error indication message can be divided into 5 levels of error protection:

Error level-1: It covers all parameters coming via FAPI. In this level we have boundary checks of all the parameters coming within a FAPI message (Only DL and UL FAPI parameters), the Cell config parameters returns Invalid message this range checking is not part of error level-1.

Error level-2: It covers the checks on total number of downlink (DL) and uplink (UL) packet data units (PDUs) supported by L1.

Error level-3: It covers the scheduling limitations/tradeoffs that exist in L1 based on the computation capacity or design. For example, L1 cannot process the Random Access Channel (RACH) and Sounding Reference Signal (SRS) together in a single subframe (SF), so accordingly a check may be placed such that when higher layers try to schedule RACH and SRS together then L1 will report appropriate error.

Error level-4: It covers the error that exists at component level limitation which can be pointer violation or memory alignment issues.

Error level-5: It covers the error that exists at component level limitation check. It may be due to calculated parameters based on the FAPI parsing parameters or scheduling related problem in L1 component.

In some embodiments, the ERROR.indication message is reported back by the L1 to the MAC in each subframe procedure using applicable limited error code for each messages. If the L2/L3 software receives an ERROR.indication message for DL_CONFIG.request, UL_CONFIG.request, HI_DCI0.request or TX.request, it should assume that the UE did not receive data and control sent in this subframe.

In some embodiments, the L1 API message formats for the ERROR.indication Message are shown below in Table 2.

TABLE 2

Error Indication Message Body

| Field | Type | Description |
|---|---|---|
| msgStatus | FAPI_MESSAGE_STATUS_T | Indicate the message status |
| message_id | UINT8 | Indicate which message received by the PHY has an error. |
| padding[3] | UINT8 | To make error code aligned to 32-bits |

TABLE 2-continued

Error Indication Message Body

| Field | Type | Description |
| --- | --- | --- |
| error_code | UINT32 | The error code |
| sbl_error_msg_body | union | Error code dependent values. The format of these bytes is dependent on the error code. See Below Tables for details |

An exemplary message body is shown below in Table 3.

TABLE 3 sbl_error_msg_body Message Body

| Field | Sub-Field | Type | Description |
| --- | --- | --- | --- |
| sfn_error | received_sfn_sf | UINT8 | Received subframe number |
| | expected_sfn_sf | UINT8 | Expected subframe number |
| pdu_error | sub_error_Code | UINT8 | Configuration or component level error code |
| | direction | UINT8 | Indicates if this error was in a DL subframe configuration or an UL subframe configuration. |
| | rnti | UINT16 | The RNTI in the received PDU. |
| | pdu_type | UINT8 | The PDU Type parameter specified in both DL subframe configuration and UL subframe configuration. |
| | padding[1] | UINT8 | Padding bytes |
| hi_error | sub_error_code | UINT8 | Configuration or component level error code |
| | phich_lowest_ul_rb_index | UINT8 | PHICH lowest UL RB index |
| tx_error | sub_error_code | UINT8 | Configuration or component level error code |
| | pdu_index | UINT8 | PDU index |
| comp_error | sub_error_code | UINT32 | Component level error code for protection level 4 and 5 |

In some embodiments, the sub error message body has passed second level of error code. But it has limited information passed to L2, its more generic code. To remedy this, the sub error code can provide an extra level of information about what sub error has been hit out of 4 classified errors (sfn_error, pdu_error, hi_error or tx_error). So to improve the error protection mechanism, providing more and accurate error indication is helpful so the MAC can take the decision more effectively. Apart from the boundary checks, error checking can send board-specific limitations to MAC so it will avoid combinations which the PHY is unable to support. For example, if a number of requested packet data units (PDUs; like BCH PDUs, PDSCH PDUs etc.) is wrong in an incoming configuration message, this can be reported back to MAC in a subframe (SF). All DL and UL config parameters can be boundary checked in this way and may have unique error codes passed back, so MAC can configure correct one or take necessary action to avoid it.

Figure 2:
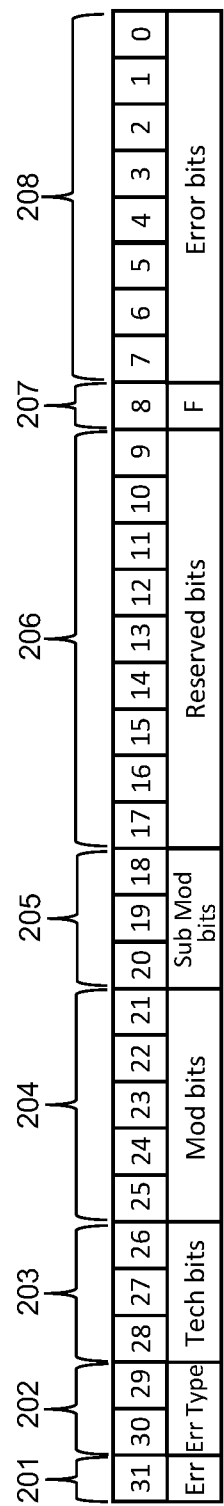
FIG. 2 is a schematic diagram of bit fields for error codes in accordance with some embodiments.

FIG. 2 is a schematic diagram of bit fields for error codes in accordance with some embodiments. An error message, in some embodiments, is a bit vector including sections 201 through 208. At section 201, the most-significant bit (MSB) is set to 1 for all errors (Bit 31).

At section 202, the next two bits are used to indicate a type of the error (Bit 30 and 29), with the following permitted values:

Information (01): This error code type are Informative only, which is not Introducing any major error but useful to convoy it to L2 for scheduling the parameter next time. This error code can be overwritten by both the Non-Fatal and Fatal error type.

Non-Fatal (10): These error code types are not breaking the system, but violation of the parameter for the current SF. This error code can be overwritten by the Fatal error type.

Fatal (11): These error code types are able to break the L1-SW, this error code is highest priority. If this error type is generated, the system may need to return immediately, and no further processing will be done.

At section 203, the next three bits for what technology the error code is generating (Bit 26 to 28). At section 204, the next five bits is used for identifying the component. These are unique values for each module (Bit 21 to 25). At section 205, the next three bits for the sub module representation, which can be used manager/kernel levels (Bits 18 to 20). Below Modules is using those 3 bits to declare its sub modules. At section 206, the next nine bits are reserved. At section 207, the 8th bit is used as flag for next 2 byte error code. It is set as '1'. At section 208, for the last 8 bits from LSB, these bits are used for error code, allowing for 256 unique error codes which, in some embodiments, may belong to each PHY error-checking submodule.

In some embodiments, there are two software subsystems used to generate the error codes for the new API: an encoder (Error code generator on Layer 1) and a decoder (Error code decoder on Layer 2). The job of Encoder is to fill the 32-bit field of the Error Code. Layer 1 is broken down into various modules and sub-modules. Each module and sub-modules has a respective bit field in the 32-bit field of the Error Code. Each module and sub-module performs a error checks and when an error occurs the Encoder is called where the respective error bit field for that module or sub-module is populated. The Decoder's job at the Layer 2 would be to process this error code received. It would have the knowledge of the respective bit fields of each module. The Implementation at the Layer 1 will be very lightweight. It is assumed not to take more than 4-5K of core cycles. Currently error Indication is sent by PHY for each subframe If an error gets hit and travel to MAC Layer. The error logs currently don't get sent to the core network or logging server. However this is not such limitations not to send these error logs, if there is a requirement it can be done.

V. Error Protection Message Example

Error Level 4 Example:

```
if ( (spm_tdp_dynamic == NULL) || (spm_tdp_static == NULL))
{
   error = (ERROR | FATAL | SPM_PRACH | SPM_PRACH_TDP |
   ERROR_NULL_POINTER);
   return error;
}
IF4_samp_ant0 = spm_tdp_dynamic->IF4_samples_ant0;
if ( ( IS_ALIGNED_SPLIB(IF4_samp_ant0, ALIGNED_8_BYTES) == 0) )
{
   error = (ERROR | NON_FATAL |SPM_PRACH|SPM_PRACH_TDP|
   ERR_4_PRACH_TDP_NOT_ALIGN);
}
```

Error level 2 Example: in some embodiments, for example, if L1 cannot process the RACH and SRS together in a single SF, accordingly a check is placed such that when higher layers try to schedule RACH and SRS together then L1 will report an appropriate error.

Figure 3:
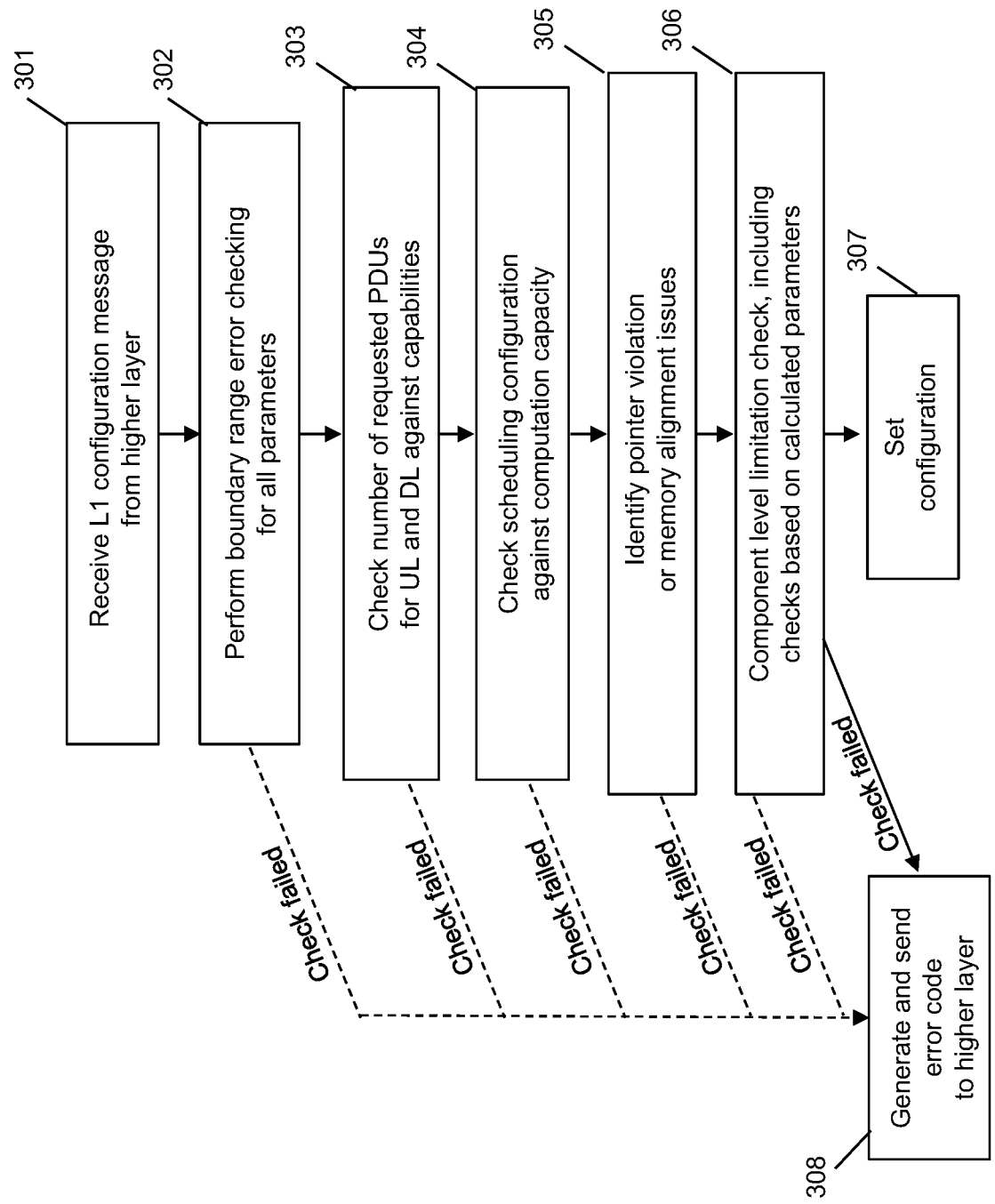
FIG. 3 is a flowchart of a method, in accordance with some embodiments.

FIG. 3 is a flowchart of a method, in accordance with some embodiments. At step 301, the method may receive a L1 configuration message from a higher layer. The PHY may be in an IDLE, or CONFIGURED, or RUNNING state. Depending on which state the PHY is in, different error checking steps may be performed. If no error is detected processing continues to step 302. In some embodiments, if an error is detected, or if an error is detected that is serious enough to stop execution (e.g., a fatal error), execution may stop and may proceed to step 308. Certain lines are shown in FIG. 3 as dotted lines to indicate that they are optional, as in some embodiments, it may be possible to avoid stopping execution. At step 302, the method may perform boundary range error checking for all parameters requested by the configuration message. This does not require coordination with other parameters already configured. If no error is detected processing continues to step 303. In some embodiments, if an error is detected, or if an error is detected that is serious enough to stop execution, execution may stop and may proceed to step 308.

At step 303, the method may check number of requested PDUs for UL and DL against the capabilities of the PHY, e.g., to make sure that the number of requested PDUs not exceed what is capable by the PHY. If no error is detected processing continues to step 304. In some embodiments, if an error is detected, or if an error is detected that is serious enough to stop execution, execution may stop and may proceed to step 308. At step 304, the method may check scheduling configuration against computation capacity. For example, the PHY may be unable to perform all of the configuration steps, such as the example where the L1 is requested to process both RACH and SRS together in one subframe. If no error is detected processing continues to step 305. In some embodiments, if an error is detected, or if an error is detected that is serious enough to stop execution, execution may stop and may proceed to step 308. At step 305, the method may identify pointer violation or memory alignment issues based on component-level limitations or constraints. If no error is detected processing continues to step 306. In some embodiments, if an error is detected, or if an error is detected that is serious enough to stop execution, execution may stop and may proceed to step 308.

At step 306, the method may component level limitation check, including checks based on calculated parameters. This can include comparing new configuration parameters with currently-active configuration parameters. If no error is detected processing continues to step 307. At step 307, if no errors have been detected, the method may set and apply the error-checked configuration. However, if at this stage any of the error conditions have been triggered, at step 308, the method may generate and send one or more specific error codes to the higher layer, e.g., the L2 or MAC layer, including in some embodiments a union of all error conditions detected in prior steps. It is possible to include any combination of steps 301-306 for error checking, and to incorporate any combination of errors generated by steps 301-306, including errors from every step, errors from no steps (i.e., successful execution), or a single error from a single step. Use of multiple error checking steps can be understood to be progressive error checking, as the multiple error checking steps progressively create the error code. In some embodiments, these can be performed in any order. The error code may be constructed and sent in one bit vector to the MAC layer.

VI. Exemplary Hardware

Figure 4:
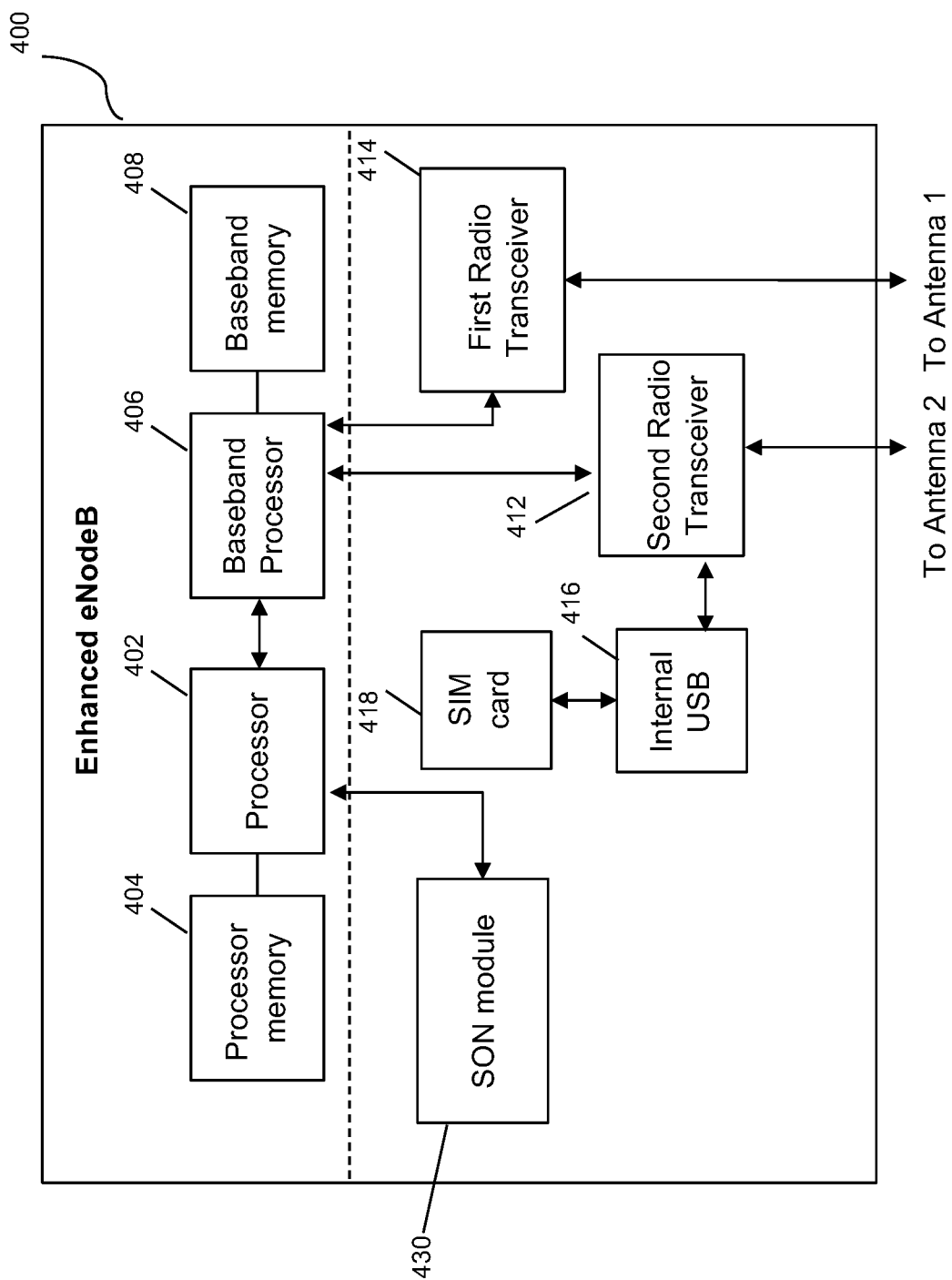
FIG. 4 is a schematic diagram of an enhanced base station, in accordance with some embodiments.

FIG. 4 is a schematic diagram of an enhanced eNodeB, in accordance with some embodiments. Enhanced eNodeB 400 may include processor 402, processor memory 404 in communication with the processor, baseband processor 406, and baseband processor memory 408 in communication with the baseband processor. Enhanced eNodeB 400 may also include first radio transceiver 410 and second radio transceiver 412, internal universal serial bus (USB) port 416, and subscriber information module card (SIM card) 418 coupled to USB port 414. In some embodiments, the second radio transceiver 412 itself may be coupled to USB port 416, and communications from the baseband processor may be passed through USB port 416.

A self-organizing network (SON) module 430 may also be included, which may include a database (not shown), in some embodiments, or which may be in communication with a coordination server (not shown), in some embodiments, or both, in some embodiments.

Processor 402 and baseband processor 406 are in communication with one another. Processor 402 may perform routing functions, and may determine if/when a switch in network configuration is needed. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. Transceiver 410 may have its L1 (PHY), L2 (MAC), and other layers implemented using software modules that are configured to run on processor 402, as described herein.

Transceiver 412 may be for providing LTE UE functionality, in effect emulating a user equipment, it may be connected via the same or different PCI-E bus, or by a USB bus, and may also be coupled to SIM card 418. SIM card 418 may provide information required for authenticating the simulated UE to the evolved packet core (EPC). When no access to an operator EPC is available, a local EPC on the enhanced eNodeB itself (not shown) may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Alternatively, transceiver 412 may be another radio access technology (RAT) radio, such as a 2G, 3G, 4G, 5G, or Wi-Fi radio. Transceivers 410 and 412 may have different RATs or the same RAT. As each RAT and as each radio has its own PHY, the concepts and methods described herein could be used for 2G, 3G, 4G, 5G, or Wi-Fi PHY and MAC layer error messaging, or a combination of multiple RAT layer error messaging modules.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), or another module. Additional radio amplifiers, radio transceivers and/or wired network connections may also be included.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the methods described assume a single-in, single-output (SISO) system, the techniques described can also be extended to multiple-in, multiple-out (MIMO) systems.

In some embodiments, the methods described can be used with 2G, 3G, 4G, 5G, Wi-Fi, or multi-RAT base stations or access points. In some embodiments, the methods described could be used in a UE as well as femto, nodeB, eNodeB, metro, or macro, as long as an API is used for communication between the PHY and the MAC layers.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, while certain methods are understood to utilize FAPI, other methods and aspects do not require the LTE Small Cell Forum FAPI or any 3GPP Release.

In some embodiments, the software needed for implementing the methods and procedures described herein may be implemented in a high level procedural or an object-oriented language such as C, C++, C #, Python, or Java. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method, comprising:
performing, in a wireless network including an Long Term Evolution (LTE) base station, physical layer control (PHY) of a wireless signal at a Layer 1 (L1) software module;
performing medium access control (MAC) of the wireless signal at a Layer 2 (L2) software module of the LTE base station;
providing an application programming interface between the L1 software module and the L2 software module for receiving L1 configuration messages and providing error codes to the L2 software module of the LTE base station;
receiving a L1 configuration message at the Layer 1 software module; and
providing a progressively generated enhanced error code from the L1 software module to the Layer 2 (L2) software module,
the enhanced error code based on progressive error checking of the received L1 configuration message at the L1 software module prior to installation as a configuration for the L1 software module.

2. The method of claim 1, wherein providing the enhanced error code further comprises performing boundary range error checking of each parameter sent in the L1 configuration message against an acceptable range for the each parameter.

3. The method of claim 2, wherein providing the enhanced error code further comprises subsequently performing error checking of a number of requested downlink (DL) or uplink (UL) protocol data units (PDUs) sent in the L1 configuration message against a supported number of DL or UL PDUs supported by the L1 software module.

4. The method of claim 3, wherein providing the enhanced error code further comprises subsequently performing error checking of a scheduling configuration sent in the L1 configuration message against a computation capacity constraint of the L1 software module.

5. The method of claim 4, wherein providing the enhanced error code further comprises subsequently performing error checking of each configuration instruction sent in the L1 configuration message to identify pointer violation or memory alignment issues.

6. The method of claim 5, wherein providing the enhanced error code further comprises subsequently performing error checking of calculated parameters based on parsing parameters sent in the L1 configuration message, and of a scheduling limitation of the L1 software module.

7. The method of claim 1, wherein providing the enhanced error code further comprises:
performing boundary range error checking of each parameter sent in the L1 configuration message against an acceptable range for the each parameter;
performing error checking of a number of requested downlink (DL) or uplink (UL) protocol data units (PDUs) sent in the L1 configuration message against a supported number of DL or UL PDUs supported by the L1 software module;
performing error checking of a scheduling configuration sent in the L1 configuration message against a computation capacity constraint of the L1 software module;
performing error checking of each configuration instruction sent in the L1 configuration message to identify pointer violation or memory alignment issues; and
performing error checking of calculated parameters based on parsing parameters sent in the L1 configuration message, and of a scheduling limitation of the L1 software module.

8. The method of claim 1, further comprising creating the enhanced error code based on a union of multiple error checking results, thereby providing error codes reflecting a plurality of errors in the L1 configuration message.

9. The method of claim 1, further comprising creating an error record in a database, the error record being the L1 configuration message associated with the enhanced error code.

10. The method of claim 1, further comprising correcting a subsequent L1 configuration message based on the error record.

11. The method of claim 1, further comprising storing a corrected L1 configuration message in association with the error record, and substituting a subsequent L1 configuration message with the corrected L1 configuration message prior to providing the corrected L1 configuration message to the L1 software module.

12. The method of claim 1, wherein the application programming interface is a Fast Application Programming Interface (FAPI).

13. The method of claim 1, wherein the L1 software module and the L2 software module are located at a 5G base station, and wherein receiving the L1 configuration message and providing the enhanced error code are performed at the 5G base station.

\* \* \* \* \*